United States Patent Office 3,039,311
Patented June 19, 1962

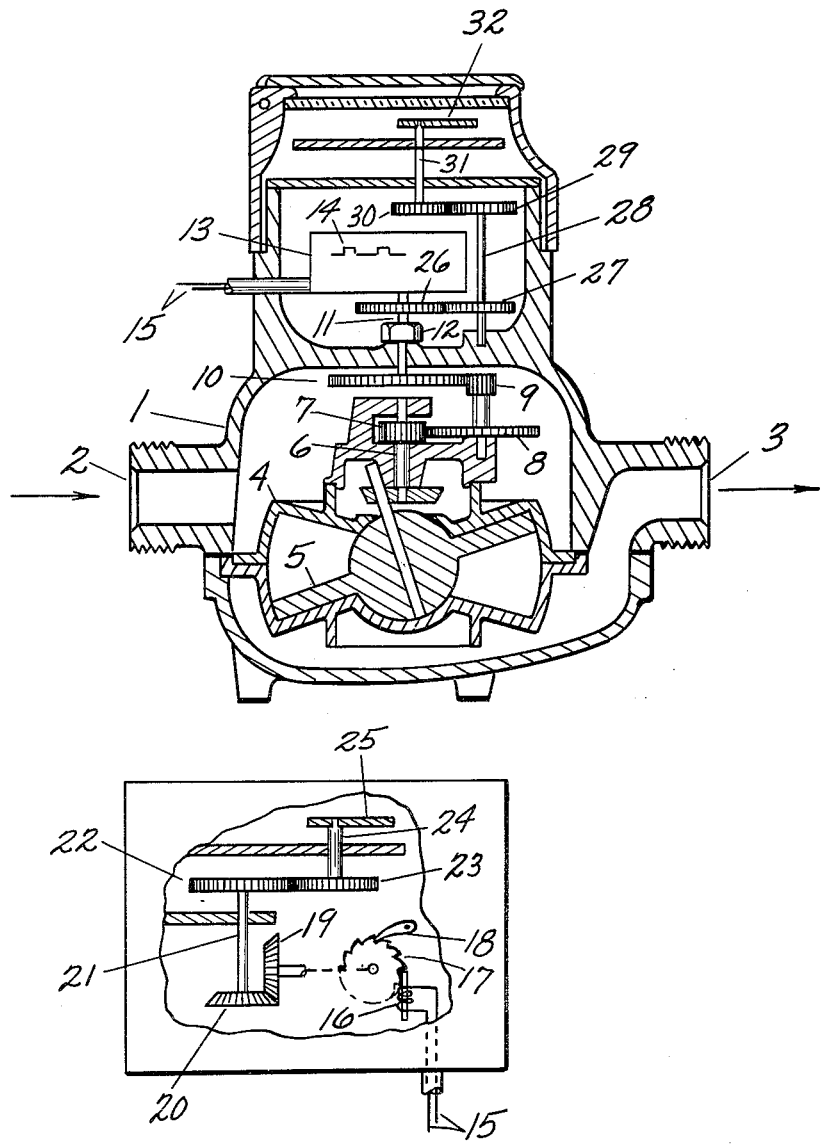

3,039,311
WATER METER
Robert S. Bassett, Buffalo, N.Y., assignor to American Meter Company, Incorporated, Philadelphia, Pa., a corporation of Delaware
Filed June 23, 1959, Ser. No. 822,239
1 Claim. (Cl. 73—258)

In water meters, the measuring element rarely operates at precisely the rate corresponding to the flow, and change gears between the meter and its register are accordingly necessary for calibration. This invention is a water meter which can be calibrated by means of change gears either at the meter or at a remote register. The meter can be in a frost free location within the building served while the remote register can be outside the building in a location convenient to the meter reader.

In the drawing, the single figure is a diagrammatic view of a water meter and its remote register.

In the drawing, the conventional parts of the water meter are readily identified, 1 being the meter casing with a water inlet 2 and a water outlet 3, and 4 being the measuring chamber in which a nutating disc 5 is arranged in the usual manner. The measuring chamber 4 is provided with the usual inlet and discharge ports so that all of the liquid entering the inlet 2 must pass through the measuring chamber in order to reach the outlet 3. The nutating disc 5 actuates a shaft 6 in the usual manner, the rotation of the shaft being proportional to the liquid passing through the measuring chamber 4. Rotation of the shaft 6 is transmitted through submerged meter gearing 7, 8, 9, 10 to a shaft 11 projecting through a stuffing box 12 in the top wall of the casing 1. The parts so far described are or may be of common construction.

The stuffing box shaft 11 driven by the meter gearing 7–10 drives an impulse generator 13, which generates voltage pulses, diagrammatically indicated at 14 in direct proportion to the number of revolutions of the shaft 11. Impulse generators are well known and may, for example, be of electromagnetic or piezoelectric types. The pulses are fed through conductors 15 to a solenoid 16 which advances a ratchet 17 one tooth for each pulse. Backward rotation of the ratchet is prevented by pawl 18. The ratchet 17 drives a gear 19 which in turn drives a gear 20 fixed to a shaft 21. Also fixed to the shaft 21 is a change gear 22 driving a change gear 23 fixed to a shaft 24 carrying a pointer 25. By means of the parts so far described, the pointer 25 is rotated in direct proportion to the rotation of the shaft 11.

For a variety of reasons, the number of turns of the shaft 11 rarely corresponds exactly to the units of flow of liquid through the measuring chamber 4 so that without calibration, the pointer 25 at the remote register would not accurately register the units of liquid flow. Accurate register of the flow may be obtained by changing the gears 22 and 23 (i.e. by selecting gears of different numbers of teeth) so that the rotation of the shaft 24 will correspond to the units of liquid flow rather than to the rotation of the shaft 11. However, since the change gears 22, 23 are located in a register remote from the meter, in some instances it may be inconvenient to effect the calibration by substituting different change gears 22, 23 and it may be simpler to effect the calibration at a register on the meter rather than at the remote register. For this purpose there is fixed to the shaft 11 a gear 26 driving a gear 27 fixed to a register shaft 28. On the upper end of the register shaft 28 is fixed a change gear 29 driving a change gear 30 on a shaft 31 carrying a pointer 32. By changing the gears 29, 30, the rotation of the pointer 32 may be caused to rotate at a rate corresponding accurately to the flow. This calibrating adjustment is made on the meter register outside the meter casing 1 and without interfering with the drive to the impulse generator. After the calibration has been made at the meter register, a corresponding change may be made in the gears 22, 23 in the remote register so both registers will read alike.

It will be noted that the impulse generator is driven by the relatively heavy meter gears 7–10 inclusive and that no objectionable loads are placed on the gears driving the meter registers.

What is claimed as new is:

A water meter comprising a meter casing having an inlet and an outlet for connection in a water line, a measuring chamber within the casing containing a nutating disc measuring element and arranged so that the water passing to the outlet flows through the measuring chamber, a stuffing box in a wall of said casing, a stuffing box shaft having one end within the casing and the other end outside the casing, submerged gearing within the casing forming a driving connection between said nutating disc and said stuffing box shaft, an impulse generator driven by said stuffing box shaft for generating voltage pulses in proportion to the revolutions of said stuffing box shaft, a register shaft geared to the other end of said stuffing box shaft, a register on the meter casing, another shaft driving an indicator, change gears on said register shaft and said other shaft for calibrating the meter to indicate the liquid flow accurately without affecting the drive to the impulse generator, a remote register, a driving shaft in the remote register, actuating means for advancing the driving shaft step by step in accordance with voltage pulses, wiring for transmitting voltage pulses from said impulse generator to said actuating means, a remote register shaft, and gearing connecting said driving shaft and said remote register shaft and including change gears of ratio corresponding to the ratio of the change gears at the meter whereby the meter may be calibrated at either the register on the meter casing or at the remote register.

References Cited in the file of this patent
UNITED STATES PATENTS

| | | |
|---|---|---|
| 1,648,491 | McAllister | Nov. 8, 1927 |
| 1,724,272 | Ford | Aug. 13, 1929 |
| 2,137,524 | Bugg | Nov. 22, 1938 |
| 2,283,408 | Bassett | May 19, 1942 |
| 2,684,810 | Bryant | July 27, 1954 |
| 2,731,625 | Melcher et al. | Jan. 17, 1956 |